United States Patent [19]
Saito

[11] 4,307,930
[45] Dec. 29, 1981

[54] LIGHT BEAM SCANNING DEVICE

[75] Inventor: Tutomu Saito, Yokohama, Japan

[73] Assignee: Tokyo Shibaura Denki Kabushiki Kaisha, Japan

[21] Appl. No.: 121,452

[22] Filed: Feb. 14, 1980

[30] Foreign Application Priority Data

Feb. 22, 1979 [JP] Japan ................... 54/19010

[51] Int. Cl.³ .................................. G02B 27/17
[52] U.S. Cl. .................................... 350/6.6
[58] Field of Search .............. 350/6.6, 6.8; 358/199, 358/293, 256; 346/94, 109, 132; 235/58 M

[56] References Cited

U.S. PATENT DOCUMENTS

| | | | |
|---|---|---|---|
| 4,025,761 | 5/1977 | Hayosk et al. | 350/6.6 |
| 4,037,231 | 7/1977 | Broyles et al. | 350/6.6 |
| 4,063,287 | 12/1977 | van Rosmalen | 350/6.6 |
| 4,178,064 | 12/1979 | Mrdjen | 350/6.6 |

*Primary Examiner*—John K. Corbin
*Assistant Examiner*—B. W. de los Reyes
*Attorney, Agent, or Firm*—Finnegan, Henderson, Farabow, Garrett & Dunner

[57] ABSTRACT

A light beam scanning device for scanning by a light beam a member to be scanned which is subjected to relative continuous feeding, comprising a main-scanning means for causing said light beam to scan said member to be scanned in a direction vertical to the direction in which it is fed, and a correcting sub-scanning means for causing said light beam to scan said member to be scanned in the direction in which it is fed, whereby the loci of scanning of said light beam on a surface to be scanned of said member become substantially parallel.

5 Claims, 17 Drawing Figures

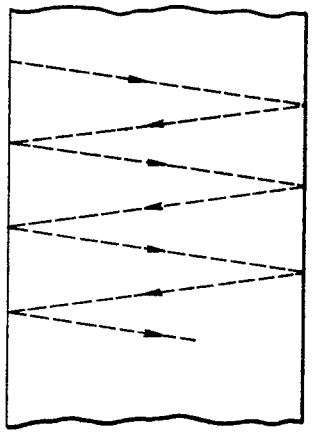
F I G. 1
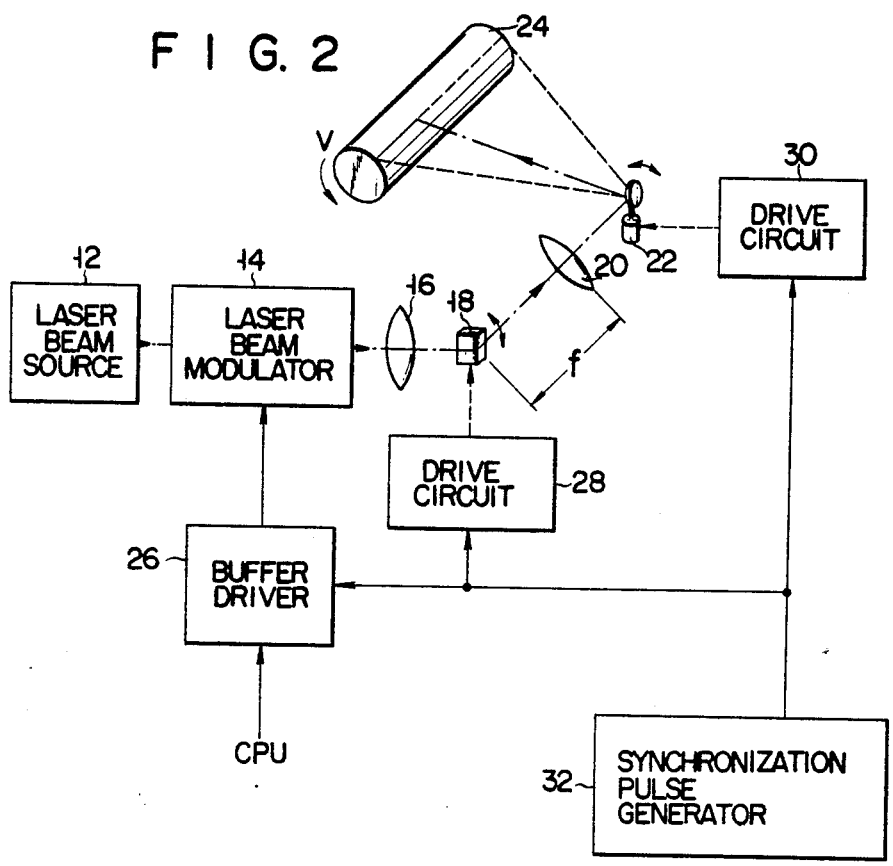
F I G. 2

LIGHT BEAM SCANNING DEVICE

This invention relates to a device which permits the reading of information from an original, or the recording thereof into a recording material, by light beams, and, more particularly, to a light beam scanning device which permits such information reading or recording by a reciprocating scanning of light beams.

There have hitherto been developed various devices which permit the reading of information from an original, or the recording thereof into a recording material by light beams by using a light beam scanning means such as a rotating mirror. For effecting the beam scanning by such devices a one-way scanning system is adopted which repetitively scans an original, for example, from its left end to its right. In this case, the original feed is effected by a continuous-feed system which usually feeds it at a specified speed.

Meanwhile, as a means to enhance the precision with which information is read or recorded it is known to increase the repetitive frequency for scanning operation and thereby increase the scanning density. A reciprocating scanning system is contemplated as one of the methods for increasing such repetitive frequency. This system permits doubling the scanning frequency over that which is obtainable by such one-way scanning systems.

However, where such a reciprocating scanning system is constructed prepared by merely modifying a main-scanning system which is directed to scanning only in the main-scanning direction (a direction vertical to the feed direction of an original or recording paper, i.e., sub-scanning direction) into a reciprocating scanning system applied to a continuous shifting system which is executed by a relative continuous shifting of a recording paper such as an original or recording material, owing to such relative continuous shifting the displacement in scanning position which is quantitatively proportionate to the shifting speed occurs in the feeding direction (sub-scanning direction) during one scanning period. As a result, the loci of the reciprocating scanning on the to-be-scanned surface take a zigzag form such as is shown in a dotted line in FIG. 1, the scan lines failing to be parallel. Namely, the scanning density varies from one place to another. An arrow mark in FIG. 1 indicates the direction in which the original or recording member is shifted.

Such failure causes a decrease in the information reading or recording precision, which constitutes a large disadvantage in practice.

A solution to this problem is given by changing the system of feeding the original or recording paper to a system of feeding it intermittently (namely, stepwise feeding). In this intermittent-feed system, however, it is necessary to synchronize the feed timing with the scanning timing. When considering the inertia of a mechanism for carrying the original or recording paper, such a requirement raises a new problem that makes the high-speed scanning operation becomes impossible.

The present invention has been made in view of the above-mentioned circumstances and is intended to provide a light beam scanning device applicable to the continuous-feed system for continuously feeding an original or recording material and which, even if reciprocating scanning is effected by using light beams, can make the scanning loci or lines of the light beam parallel, thereby to improve the precision with which information is read or recorded.

The above object of the invention has been attained by correcting the displacement in scanning position which occurs, due to the relative shift of an original or recording paper, in the feeding direction (sub-scanning direction).

Namely, the present invention, in order to correct the displacement in scanning position in the feeding direction adapts the scanning for displacement correction in the sub-scanning direction (sub-scanning) as well as the scanning in the main-scanning direction (main-scanning).

According to the invention, there is provided a light beam scanning device permitting a scanning, by light beams, of a surface to be scanned of a material subjected to relative continuous feed, which comprises a light beam source emitting a light beam, a main-scanning means subjecting said light beam to reciprocating scanning in a direction vertical to the direction in which said material is fed, and a correcting sub-scanning means for scanning said light beams in the direction in which said material is fed, whereby the loci of said light beam on said surface to be scanned of said material are made substantially parallel.

This invention can be more fully understood from the following detailed description when taken in conjunction with the accompanying drawings, in which:

FIG. 1 is a view showing one conventional beam-locus pattern obtained with a reciprocating scanning system;

FIG. 2 shows a light beam reciprocating scanning device according to an embodiment of the invention which is applied to an information reading means;

Figure 3A:
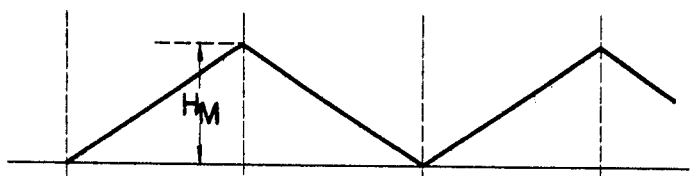
FIGS. 3A, 3B and 3C show a deflection signal waveform for main-scanning, a deflection signal waveform for sub-scanning and a synchronization signal waveform all of which are used to drive the scanning device shown in FIG. 2, respectively.

We will now explain an embodiment of the invention by referring to FIG. 2. In FIG. 2 there is shown a light beam reciprocating scanning device according to that embodiment of the invention which is applied to an information reading means.

Reference numeral 12 is a laser beam source, and 14 a light beam modulator for modulating the light intensity of a laser beam. Numeral 16 is a lens, 18 a piezoelectric-type beam deflecting element for sub-scanning, 20 is a lens, and 22 a galvano-mirror for main scanning. Numeral 24 is a drum as a recording member on which information is recorded. Numeral 26 is a buffer driver for sequentially supplying, for each scanning period, information corresponding to each scanning period to the laser beam modulator 14. Numeral 28 is a drive circuit for driving the deflecting element 18 and 30 a drive circuit for driving the galvano-mirror 22 for main scanning. The buffer driver 26, each time one scanning period is completed, receives, from a central processing unit CPU not shown, the record information corresponding to that one scanning period and converts this parallel information into a serial information and supplies this information, as the said record information, to the laser beam modulator 14. Since in the reciprocating scanning system the converting order of converting the parallel record information into serial information at the time of forward scanning should be reversed at the time of return scanning, the buffer driver 26 should have two registers capable of storing therein, for example, data corresponding to one scanning period. The two shift registers are so constructed that the direction in which the contents of one of such registers are shifted is opposite to that in which the contents of the other are shifted, whereby to cause such two shift registers to alternately operate in synchronization with a synchronization signal having a frequency equal to the repetitive frequency for the scanning operation.

Figure 3B:
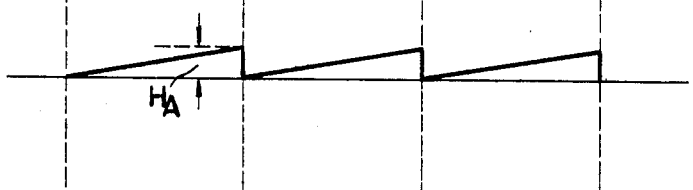

The drive circuit 30 supplies a deflection signal for main-scanning such as is shown in FIG. 3A to the galvano-mirror 22, while the drive circuit 28 supplies a deflection signal for sub-scanning such as is shown in FIG. 3B to the deflecting element 18. The waveform of the deflection signal shown in FIG. 3A indicates the deflection pattern of the laser beam at the galvano-mirror 22. In other words, that waveform pattern indicates a main-scanning pattern of the laser beam. The deflection signal waveform shown in FIG. 3B indicates the deflection pattern of the laser beam at the deflecting element 18, in other words, a sub-scanning pattern of the laser beam.

The main scanning is defined, here in this specification, to mean the scanning operation which is carried out in a direction vertical to, i.e. perpendicular to, the direction in which the to-be-scanned material is fed. The sub-scanning is defined herein to mean the scanning operation which is performed in the continuous feeding direction. As apparent from the previous description, the sub-scanning is a correcting scanning which serves to make parallel the to-and-fro scanning loci. Otherwise, in case the relatively moving to-be-scanned material is reciprocatingly scanned without subjecting, this scanning operation to any correction, the loci will fail to become parallel.

Figure 3C:

The operation of the buffer driver 26 and the drive circuits 28 and 30 are operated in synchronism with a synchronizing signal such as shown in FIG. 3C. The lenses 16 and 20 are provided for the purpose of reducing to a desired diameter the spot diameter of the laser beam irradiated onto the to-be-scanned surface of the drum 24. The distance between the lens 20 and the deflecting element 18 preferably is set to a focal distance f of the lens 20. Even if the laser beam is acted on by the deflecting element 18 to sub-scanning, this keeps the incident angle of the laser beam fixed.

Since, however, the deflection width for sub-scanning is practically very small, the lens 20 does not always have to be provided in practice and in such cases such focussing becomes unnecessary.

Meanwhile, in the laser beam reciprocating scanning device comprised of the above-mentioned constituent elements, the laser beam emitted from the laser beam source 12 has its intensity modulated by the modulator 14 in response to the record information from the buffer driver 26. Namely, the laser beam outputted from the modulator becomes a signal which is the record information as expressed in terms of light intensity. As previously stated, the record information is fed, for each completion of one scanning period, from the not-shown CPU by the amount corresponding to that one scanning period, via the buffer driver 26. The laser beam is thereby modulated in its intensity and is fed to the deflecting element 18 via the lens 16. The deflecting element 18 receives a deflection signal of such a waveform as shown in FIG. 3B from the drive circuit 28 and corrects the displacement in scanning position as taken in the direction in which the to-be-scanned material is fed, i.e., in the sub-scanning direction. Thus, the deflecting element 18 deflects the laser beam which enters the same in correspondence to the waveform of that deflection signal. Thus, the deflection signal waveform of FIG. 3B can be regarded as the sub-scanning pattern of the laser beam. In FIG. 3B, therefore, one period T corresponds to one scanning period, the degree of inclination of the waveform corresponds to the speed at which the to-be-scanned surface of the drum 24 is moved, and the maximum amplitude $H_A$ corresponds to the maximum displacement in scanning position which occurs in the sub-scanning direction during one period. Therefore, the laser beam which is deflected in the sub-scanning direction by the deflection signal having such a waveform as shown in FIG. 3B corrects the displacement in scanning position as taken in the sub-scanning direction. The laser beam from the deflecting element 18 which has been subjected to sub-scanning deflection enters the galvano-mirror 22 via the lens 20. The galvano-mirror 22 deflects the laser beam incident thereto in the pattern of the deflection signal having such a waveform as shown in FIG. 3A. Therefore, the waveform of the deflection signal of FIG. 3A can be regarded as the pattern of the main-scanning deflection of the laser beam. Since, in this way, the signal waveform shown in FIG. 3A corresponds to the main-scanning pattern, one period T of the FIG. 3A shown signal waveform corresponds to one scanning period and the maximum amplitude $H_M$ corresponds to the scanning width as taken in the main scanning direction. The laser beam which has been deflected by the galvano-mirror is irradiated onto the drum 24 for recording the information onto the drum. Note here that the signal shown in FIG. 3C is a synchronization signal outputted from a synchronization pulse generator circuit 32.

The maximum amplitude $H_A$ of the sub-scanning deflection signal (FIG. 3B) is small as compared with the maximum amplitude $H_M$ of the main-scanning deflection signal (FIG. 3A). When it is now assumed that V represents the rotating speed of the drum 24 (the speed thereof at the to-be-scanned surface) and T the period of the synchronization pulse signal, then $H_A = V.T$.

Figure 4:
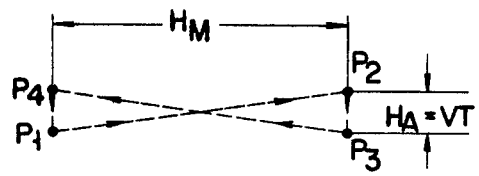
FIG. 4 shows the beam loci due to the reciprocating scanning which are obtained when, on the assumption that the drum or a member to be scanned is kept motionless, the scanning device of FIG. 2 is driven by the signals shown in FIGS. 3A and 3B.

Assume now that the drum 24, a to-be-scanned member, is out of rotation. Then, the laser beam is allowed under this condition to scan in accordance with the signals having the waveforms shown in FIGS. 3A and 3B to describe the locus such as that indicated by the dotted line of FIG. 4. In more detail, when it is assumed that the beam spot is located at a position $P_1$ at a time $t_1$, it moves, with the lapse of time, in the rightward and upward direction to reach a position $P_2$ at a time $t_2$ and at the same time move from the position $P_2$ to a position $P_3$.

With a further lapse of time, the beam spot position moves in the leftward and upward direction to reach a position $P_4$ at a time $t_3$ and at the same time return to the initial position $P_1$. Thus, the beam spot thereafter describes a similar locus, repeatedly.

Figure 5:
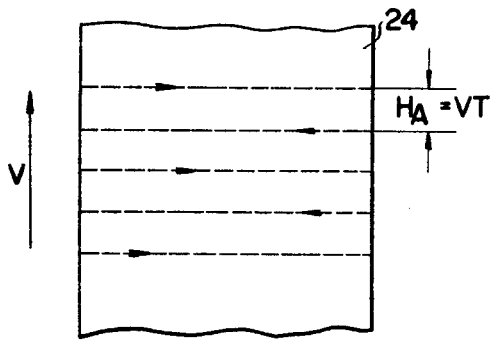
FIG. 5 shows the beam loci due to the reciprocating scanning which are obtained when, in case the drum is subjected to relative feeding, the scanning device of FIG. 2 is driven by the signals shown in FIGS. 3A and 3B.

When it is assumed that the drum 24 is at rest, the laser beam describes the above-mentioned locus. Therefore, when the drum 24 rotates at a constant speed V in a direction indicated by the arrow in FIG. 2, such beam loci, substantially parallel to the axis of the drum 24 as shown by the dotted lines of FIG. 5, are described on the to-be-scanned surface of the drum 24.

As clear from the foregoing explanation, according to this embodiment, even if reciprocating scanning is carried out with the to-be-scanned member, i.e., the rotating drum 24, the loci of such reciprocating scanning on the drum surface will be parallel with the consequence that recording of information can be achieved with high precision.

Additionally, the drum 24 may be wound, for recording of information, with a recording paper which may be sensitive to the laser beam. Or an electron charge distribution corresponding to record information may be formed on the to-be-scanned surface of the drum 24 by means of laser beams, and thereafter this electron charge distribution can be transcribed onto a recording paper by a known duplicating process.

Reference will now be made to other scanning modes of the invention by reference to the waveforms of scanning deflection signals shown in FIGS. 6A and 6B.

Figure 6A:
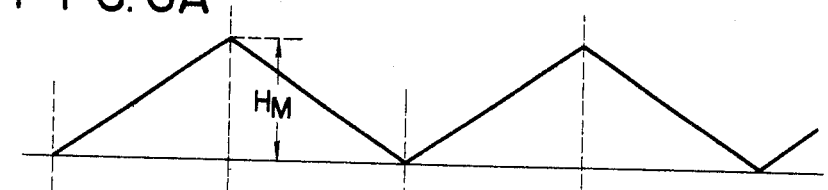
FIGS. 6A and 6B show another waveform of the deflection signal for main scanning and another waveform of the deflection signal for sub-scanning both of which are used to drive the scanning device of FIG. 2, respectively.

FIG. 6A shows the waveform of a main-scanning deflection signal, which waveform is the same as that of the main-scanning deflection signal shown in FIG. 3A. However, the waveform of the sub-scanning deflection signal shown in FIG. 6B differs from that of the sub-scanning deflection signal shown in FIG. 3B. In the signal shown in FIG. 6B, however, unlike the signal shown in FIG. 3A every period does not always have the same waveform but there alternately occurs a waveform period having a flat waveform in which the degree of inclination, i.e., the amplitude $H_A$ is fixed and a waveform period having an inclined waveform in which the waveform is inclined at a degree of inclination. The maximum amplitude of this waveform is twice, $2H_A$ ($=2VT$), as large as that ($H_A$) of the waveform of the sub-scanning deflection signal shown in FIG. 3B.

Figure 6B:
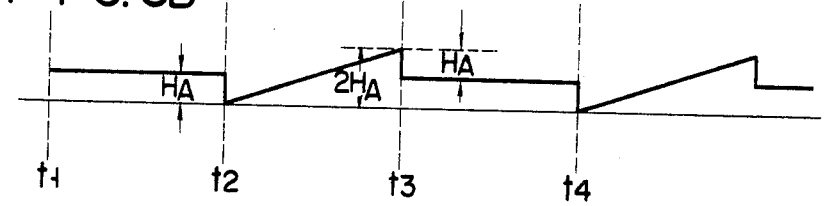

Assume now that under the condition in which the drum rotation is stopped a laser beam is allowed to scan in accordance with the signals shown in FIGS. 6A and 6B. Then, the laser beam describes a locus such as is shown in a dotted line in FIG. 7 on the surface to be scanned of the drum 24. To explain in more detail, when it is assumed that the beam spot is located at a position $P_1$ at a time $t_1$, with the lapse of time the beam spot locus shifts in the axial direction of the drum 24 to reach a position $P_2$ at a time $t_2$ and substantially simultaneously shifts to a position $P_3$. With further lapse of time the beam spot moves in the leftward and upward direction to reach a position $P_4$ at a time $t_3$ and substantially simultaneously returns to the initial position $P_1$. Thus, the beam spot thereafter describes a similar locus, repeatedly.

Figure 7:
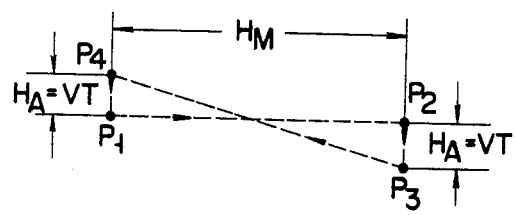
FIG. 7 shows the beam loci due to the reciprocating scanning which are obtained when, on the assumption that the drum is kept at rest, the scanning device of FIG. 2 is driven by the signals shown in FIGS. 6A and 6B.
Figure 8:
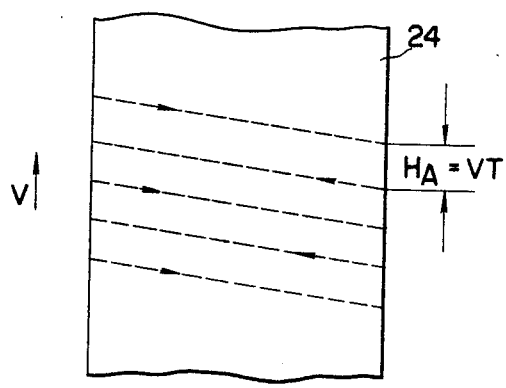
FIG. 8 shows the beam loci due to the reciprocating scanning which are obtained when, in case the drum is kept in rotation, the scanning device of FIG. 2 is driven by the signals shown in FIGS. 6A and 6B.

The scanning locus of the laser beam during the period in which the drum 24, i.e., the to-be-scanned member is at rest traces, as above, such a beam spot pattern as shown in FIG. 7. In FIG. 2, therefore, when the drum 24 is kept in rotation at a specified speed V, there are described, over the to-be-scanned surface of the drum 24, the scanning loci which, though they are inclined with respect to the drum axis, are parallel to one another. Though, in this case, the said scanning loci are not parallel to the axis of the drum 24, yet the loci themselves become parallel to one another. No practical problem, therefore, is raised in this regard.

Figure 9:
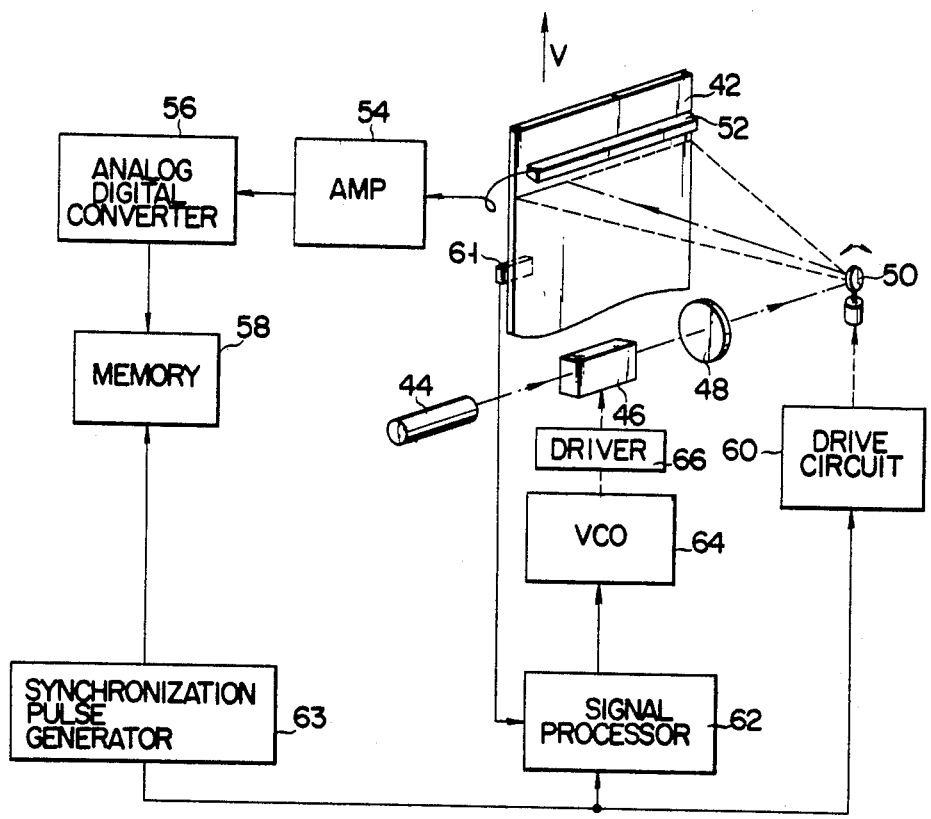
FIG. 9 shows a light beam reciprocating scanning device according to another embodiment of the invention which is applied to an information recording means.

In FIG. 9, there is shown another embodiment of the invention. The device shown in FIG. 9 is a laser beam reciprocating scanning device which is applied to an original information reading means.

Reference numeral 42 is an original member which is carried at a specified speed V, 44 a laser beam source, 46 a laser modulator of a type designed to have acousto-optics effect, 48 a focussing lens, 50 a galvano-mirror, and 52 a photo-electric converter.

When the reading operation is carried out, a laser beam is emitted from the laser beam source 44. This laser beam arrives at the original member 42 via the laser modulator 46, lens 48 and the galvano-mirror 50. The laser beam reflected from the original member 42, namely, the signal containing information such as letters, figures, etc. on the original member 42 is converted by the photo-electric converter 52 into an electric signal. After being amplified by the amplifier 54, the information signal is converted by an analog to digital converter 56 into digital data. The data are written into a memory 58 and are stored therein. The data thus stored are read out in the subsequent process of processing images.

The galvano-mirror 50 is a main-scanning deflection means as in the case of the above-mentioned embodiment. This galvano-mirror 50 is driven in accordance with such a deflection signal from a drive circuit 60 such as is shown in FIG. 3A or 6A, thereby to deflect the laser beam so as to cause the laser beam to reciprocatingly scan the to-be-scanned surface of the original member 42 in a direction vertically intersecting the direction in which the said to-be-scanned surface is allowed to rotate. The laser beam modulator 46 is a sub-scanning deflection means which is provided for the purpose of sub-scanning the original member 42 so as to permit the locus of the laser beam on the original member 42 to become parallel to the direction in which the said to-be-scanned surface of the original member 42 advances.

Meanwhile, it is generally known that the above-mentioned acousto-optic light modulator has the characteristic that since at the time when the carrier frequency applied thereto is varied the grid pitch varies, the angle of deflection is varied to make it possible to alter the direction in which the laser beam incident to the modulator advances. By varying the carrier frequency of the acousto-optic light modulator 46 utilizing that characteristic the laser beam can be allowed to sub-scan the original member 42 in such a signal pattern as shown in FIG. 3B or 6B.

Figure 10:
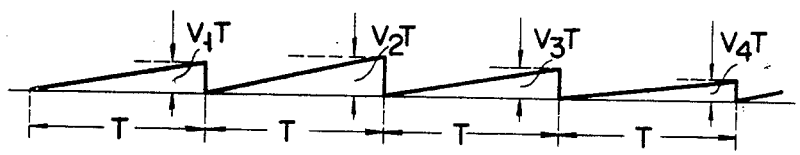
FIG. 10 shows the waveform of a deflection signal for sub-scanning which is used for the embodiment shown in FIG. 9.

Frequently, the speed with which the original member 42 is moved is not specified for the particular original member carrying mechanism (not shown). Therefore, if reciprocating scanning is performed taking the variation in the moving speed of the member 42 out of consideration, it becomes difficult to achieve the readout operation with high precision. To avoid this, in this embodiment, a speed detector 61 is provided. Thus, the actual moving speed of the original member 42 is detected by the speed detector 61 and the information of the moving speed thus detected is converted by a signal processor 62 into a sub-scanning signal having the waveform of a voltage signal. The signal processor 62 generates in response to the speed information from the speed detector 61, a saw-tooth like voltage signal representing the sub-scanning pattern such as is shown in FIG. 10. The inclination of each saw-tooth like waveform of the voltage signal shown in FIG. 10 is arranged to automatically vary in accordance with the moving speeds $V_1, V_2, V_3, V_4, \ldots$ as detected. The voltage signal of such waveform is applied to a voltage controlled oscillator (VCO) 64 and is thus converted into a frequency signal proportionate to the voltage level. Then, the frequency signal output from the VCO 64 is applied as a carrier frequency signal through the driver 66 to the acousto-optic light modulator 46. Thus, a sub-scanning operation for correction is performed with high precision. The memory 58, drive circuit 60 and signal processor 62 are controlled by a synchronization pulse signal from a synchronization pulse generator 63.

As apparent from the foregoing explanation including the description of the above-mentioned embodiments, according to the invention, even the reciprocating scanning of an original or recording member by a laser beam with such member kept continuously fed makes it possible to obtain substantially parallel reciprocating scanning loci. It is possible, therefore, to read the information of an original or record the same into a recording member with high precision.

As a modification of the invention, the scanning device shown in FIG. 2 may be so constructed, without using the piezo-type beam reflecting element 18, that the acousto-optic light modulator 14 has both functions of effecting the beam-intensity modulation in correspondence to the record information and of effecting a sub-scanning deflection.

In the above-mentioned embodiments, the assumption was made that the drum 24 is allowed to rotate at a specified speed V or that the original member 42 moves at a specified speed. The explanation made in connection with the above embodiments similarly applies to the case when reciprocating scanning is effected while the main-scanning mechanism is being moved at a specified speed relatively to the original member 42 under the condition in which it is kept at rest. For instance, in the scanning device shown in FIG. 9, with the original member 42 not moving, reciprocating scanning may be effected by moving the galvano-mirror 50 and the photo-electric converter 52 at a specified speed with one of these maintained to have a specified positional relation with the other.

Accordingly, here in this specification, the wording "relative continuous feed" should be interpreted to mean the mode in which either one of the to-be-scanned member or the main-scanning mechanism is allowed to rest while the other is allowed to move continuously.

In the foregoing description of the specification, the light beam reciprocating scanning device of the invention has been described in detail by taking, as examples, the two embodiments. Other embodiments and modifications, however, can of course be contemplated without departing from the spirit and scope of the invention.

The above-mentioned two embodiments (FIGS. 2 and 9) referred to the reciprocating scanning system. The scanning device of the invention, however, can also be applied to a unidirectional scanning system, namely, a one-way scanning system.

Figure 11A:
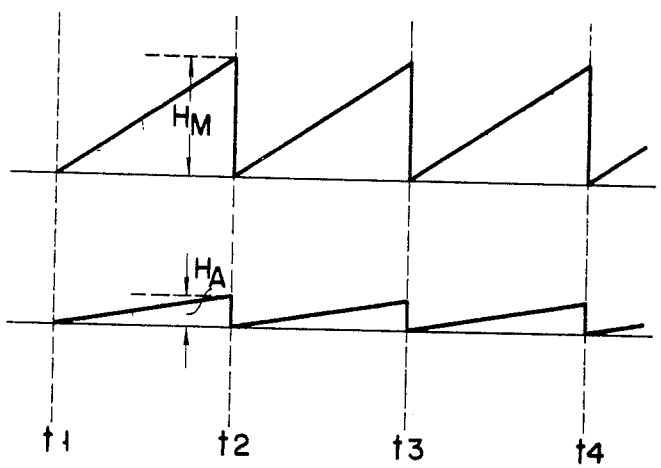
FIGS. 11A and 11B show another waveform of the deflection signal for main scanning and another waveform for sub-scanning, respectively.
Figure 11B:
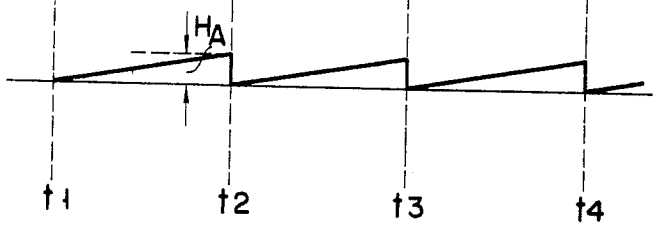

FIGS. 11A and 11B show a main-scanning deflection signal and a sub-scanning deflection signal which are used to execute the one-way scanning system, respectively. The former signal has triangular consecutive waveforms each having a maximum amplitude $H_M$, while the latter similarly has triangular consecutive waveforms which are each the same as that shown in FIG. 4B and which have each a maximum amplitude $H_A$.

Reference will now be made to the beam loci which are obtained when the surface to be scanned of the original member has been scanned by the deflection signals shown in FIGS. 11A and 11B.

Assume now that the to-be-scanned surface is kept at rest and a laser beam is allowed under this condition to scan it by using the deflection signals shown in FIGS. 11A and 11B. Then, the beam loci are as indicated in a dotted line in FIG. 12. Namely, when the beam spot is assumed to be located at a point $P_1$ at a time $t_1$, it moves, with the lapse of time, along the to-be-scanned surface in the rightward and downward direction of FIG. 12 to reach a point $P_2$ at a time $t_2$ and substantially simultaneously shifts to a point $P_3$. Thereafter, the beam spot further moves, with the lapse of time, again in the rightward and downward direction to reach a point $P_4$. Thereafter, the same scanning operation is repeated.

Figure 12:
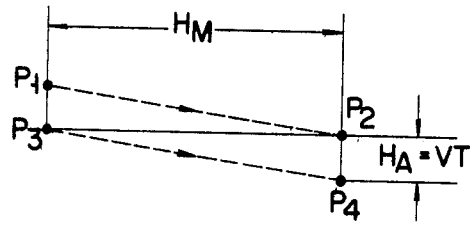
FIG. 12 shows the beam loci which are obtained when the to-be-scanned member at rest is scanned by the deflection signals for main- and sub-scannings shown in FIGS. 11A and 11B.
Figure 13:
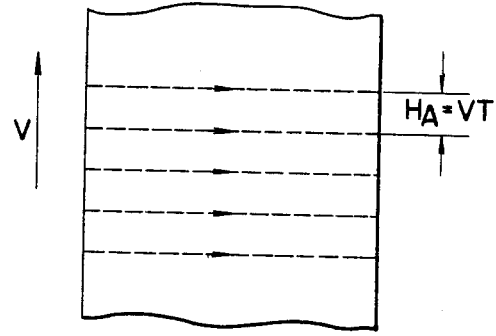
FIG. 13 shows the beam loci which are obtained when the to-be-scanned member in relative motion is scanned by the deflection signals for main- and sub-scannings.

Since the scanning beam loci obtained with the to-be-scanned member kept at rest are as shown in FIG. 12, the beam loci which are described on the to-be-scanned surface when the original member is allowed to rotate at a specified speed become the parallel loci which intersect the advancing direction of the original member as shown in FIG. 13.

In such a way, the scanning device of the invention, even when it is used adopting the one-way scanning system, enables the scanning beam loci to be parallel intersecting the advancing direction of the to-be-scanned original member. According to the invention, therefore, the highly accurate reading or writing of information becomes possible.

The foregoing description referred to the scanning system which uses a single beam. The technical concept of the invention can of course be applied to a multi-scanning system which utilizes multiple beams.

What is claimed is:

1. A light beam scanning device for scanning by a light beam a member which is fed with a specified speed, comprising a light beam source for emitting a light beam, main-scanning means including a first deflection signal generation circuit and first light beam deflection means, said first generation circuit generating a first deflection signal having a waveform which varies linearly with time and said first deflection means deflecting the light beam in accordance with the first deflection signal to scan the member in a direction perpendicular to the direction in which it is fed, and sub-scanning means including a second deflection signal generation circuit and second light beam deflection means, said second generation circuit generating a second light beam deflection signal having a waveform which includes at least a portion varying linearly with time and said second light beam deflection means deflecting the light beam in accordance with the second deflection signal to scan the member in a direction parallel to the direction in which it is fed, said main-scanning means together with said sub-scanning means making the loci of the light beam on the member parallel to each other.

2. A light beam scanning device according to claim 1, wherein said first deflection signal has a triangular waveform comprising two linear portions opposite in direction to each other, wherein each linear portion constitutes one scanning period T, and the second deflection signal has a sawtooth waveform in which each saw-tooth portion constitutes one scanning period T and the maximum amplitude $H_A$ is $H_A = V.T$ where V represents the speed with which the member is fed.

3. A light beam scanning device according to claim 1, wherein the first deflection signal has a triangular waveform comprising two linearly varying portions opposite in direction to each other, wherein each portion constitutes one scanning period T, and the second deflection signal has a waveform comprising first and second adjacent portions each constituting one scanning period T, the first portion being a flat portion of a fixed amplitude of V.T and the second portion being a triangular portion of which the maximum amplitude $H_A$ is $H_A = 2 V.T$ where V represents the speed with which the member is fed.

4. A light beam scanning device according to claim 1 wherein the first deflection signal has a first triangular waveform in which each triangular portion constitutes one scanning period T, and the second deflection signal has a second triangular waveform in which each triangular portion constitutes one scanning period T, the maximum amplitude $H_A$ of the second triangular waveform being $H_A = V.T$ where V represents the speed with which the member is fed.

5. A light beam scanning device according to claim 1, wherein the second light beam deflection means is a piezotype light deflecting member.

* * * * *